(12) United States Patent
Segawa et al.

(10) Patent No.: US 7,309,068 B2
(45) Date of Patent: Dec. 18, 2007

(54) RUBBER GASKET FOR SEPARATOR OF FUEL CELL

(75) Inventors: Toru Segawa, Shizuoka (JP); Atsushi Omura, Shizuoka (JP); Katsuya Kusuno, Shizuoka (JP); Tetsuo Ohinata, Shizuoka (JP); Chisato Kato, Aichi-ken (JP); Toshiyuki Suzuki, Aichi-ken (JP); Naohiro Takeshita, Aichi-ken (JP); Yasuyuki Asai, Aichi-ken (JP)

(73) Assignees: Nichias Corporation, Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 10/900,405

(22) Filed: Jul. 28, 2004

(65) Prior Publication Data

US 2005/0035560 A1 Feb. 17, 2005

(30) Foreign Application Priority Data

Jul. 30, 2003 (JP) ............................ P.2003-282774

(51) Int. Cl.
*F02F 11/00* (2006.01)
*F16J 15/02* (2006.01)
(52) U.S. Cl. ...................... 277/596; 277/644
(58) Field of Classification Search ................ 277/594, 277/626, 627, 628, 644, 596
See application file for complete search history.

(56) References Cited

U.S. PATENT DOCUMENTS

| | | | |
|---|---|---|---|
| 2,789,844 A * | 4/1957 | Kessler | 285/336 |
| 3,429,581 A * | 2/1969 | Himmel | 277/625 |
| 3,510,139 A | 5/1970 | Potter | |
| 3,619,458 A * | 11/1971 | Engelhardt | 264/260 |
| 3,775,832 A * | 12/1973 | Werra | 29/450 |
| 4,034,994 A * | 7/1977 | Ohta et al. | 277/625 |
| 4,192,520 A * | 3/1980 | Hasegawa | 277/591 |
| 4,292,269 A * | 9/1981 | Hock | 264/299 |
| 4,819,953 A * | 4/1989 | Joh | 277/591 |
| 5,228,702 A * | 7/1993 | Browne et al. | 277/608 |
| 5,687,975 A * | 11/1997 | Inciong | 277/591 |
| 5,692,758 A * | 12/1997 | Wikstrom | 277/591 |
| 6,361,049 B1 * | 3/2002 | Joco | 277/312 |
| 6,523,833 B1 * | 2/2003 | Ishigaki et al. | 277/650 |
| 6,722,660 B2 * | 4/2004 | Gernand et al. | 277/591 |
| 2003/0013001 A1 | 1/2003 | Koch et al. | |
| 2003/0164596 A1* | 9/2003 | Kane et al. | 277/644 |
| 2004/0160018 A1* | 8/2004 | Dupont et al. | 277/628 |
| 2005/0062234 A1* | 3/2005 | Kuribayashi | 277/602 |

FOREIGN PATENT DOCUMENTS

| | | |
|---|---|---|
| GB | 2 338 989 | 1/2000 |
| JP | 2003-49949 | 2/2003 |
| JP | 2003-56704 | 2/2003 |

* cited by examiner

*Primary Examiner*—Richard E. Chilcot
*Assistant Examiner*—Gay Ann Spahn
(74) *Attorney, Agent, or Firm*—Nixon & Vanderhye P.C.

(57) ABSTRACT

A rubber gasket to be disposed in a compressed state between separators of a fuel cell includes a sealing portion having a sectional shape of a two-projection structure with a first projection having a curved slope of a first curvature radius (D), and a second projection provided on the first projection and having a second curvature radius (H). A pedestal portion extends in a horizontal direction with a predetermined thickness continuously from a foot portion of the curved slope of the first projection and has a flat bottom surface.

9 Claims, 3 Drawing Sheets

RUBBER GASKET FOR SEPARATOR OF FUEL CELL

FIELD OF THE INVENTION

The present invention relates to a rubber gasket to be placed in a compressed state between separators of a fuel cell.

BACKGROUND OF THE INVENTION

Fuel cells, in general, have a multiple of cell units which are layered to form a stack, and each of the cell units has a structure that electrodes serving also as catalyst layers are so disposed as to sandwich an electrolyte layer and a separator is disposed outside each of the electrodes. The separators function as a partition wall of a passage for a gas such as hydrogen gas and oxygen gas or for cooling water, and a gasket made from a rubber is provided therewith for the purpose of sealing against the gas or the cooling water.

The rubber gasket is sandwiched between the separators during assembly of a fuel cell and compressed to a predetermined thickness In that case, a compression ratio of the rubber gasket is typically set to 15 to 60% in view of a variation in separator thickness and a gap between the separators to which the gasket is placed. Though a sealing property is improved when the compression ratio is high, a reaction force (a force of pressing against the separators to resist the compression) of the rubber gasket is increased due to the high compression ratio, and when the compression ratio is too high, a problem of breakage of the separators occurs. The thickness and the width of the rubber gasket may be reduced so as to reduce the reaction force of the rubber gasket; however, in the case of a low compression ratio, such modification leads to an insufficient reaction force which causes a problem of deterioration in sealing property. Rubber gaskets involve such antinomy problems in the relationship between the size and the compression ratio irrespective of its usage.

Various rubber gaskets modified in shape have heretofore been proposed for the purpose of solving the above-described antinomy problems. For example, as shown in a sectional view of FIG. 2, a rubber gasket having a main bead portion 5 obliquely projecting to the inner side from an edge of a substrate 4 whose section has a substantially rectangular shape is known (see, for example, Patent Document 1). The rubber gasket is readily compressed because the main bead portion 5 is easily bent down upon mounting and has a small reaction force, and a sufficient sealing property is ensured by the bent main bead portion 5. However, though the main bead portion 5 functions as described above in the case where the rubber gasket is made from a thermoplastic elastomer having a hardness of 20 to 50 (durometer; type A), a crack is caused in the bent main bead portion 5 due to compression in the case where the rubber gasket is made from a rubber having a higher hardness, thereby causing a problem of a reduced sealing property.

Further, as shown in a sectional view of FIG. 3, a rubber gasket having a bead-like sealing lip 7 which is formed on a lower flat sealing structure 6 of a substantially trapezoidal shape has been proposed (see, for example, Patent Document 2). However, this rubber gasket has a problem that a reaction force is increased too much when the compression ratio is 60% due to a large sectional area of the lower flat sealing structure 6.

Patent Document 1: JP-A-2003-49949
Patent Document 2: JP-A-2003-56704

SUMMARY OF THE INVENTION

The present invention has been accomplished in view of the above-described situation.

Accordingly, an object thereof is to provide a rubber gasket for separators in a fuel cell, the rubber gasket being free from an excessive reaction force in the case of a high compression ratio and capable of ensuring an excellent sealing property in the case of a low compression ratio.

Other objects and effects of the invention will become apparent from the following description.

The inventors have conducted extensive research to attain the above objects and have found that it is effective to form a sealing portion of a rubber gasket into a specific two-projection structure, thereby accomplishing this invention.

More specifically, the above-described objects of the invention have been achieved by providing the following rubber gasket for a separator of a fuel cell:

(1) A rubber gasket to be disposed in a compressed state between separators of a fuel cell, which comprises;
    a sealing portion having a sectional shape of a two-projection structure comprising;
        a first projection having a curved slope of a first curvature radius D; and
        a second projection provided on the first projection and having a second curvature radius H; and
        a pedestal portion that extends in a horizontal direction with a predetermined thickness continuously from a foot portion of the curved slope of the first projection and has a flat bottom surface.

(2) The rubber gasket according to item (1) above, having a height from the bottom of the pedestal portion to the top of the second projection of from 0.65 to 0.85 mm.

(3) The rubber gasket according to item (1) or (2) above, wherein the curvature radius D of the curved slope of the first projection is 0.2 mm or greater.

The rubber gasket of this invention reduces a reaction force by alleviating a stress concentration owing to the first projection in the case of a high compression, and the second projection is pushed down in the case of a low compression to ensure an excellent sealing property owing to a reaction force thereof. Therefore, according to this invention, it is possible to prevent an excessive reaction force in the case of a high compression ratio as well as to ensure the excellent sealing property in the case of a low compression ratio, so that a rubber gasket capable of suitably sealing between separators in a fuel cell is provided.

Figure 1:
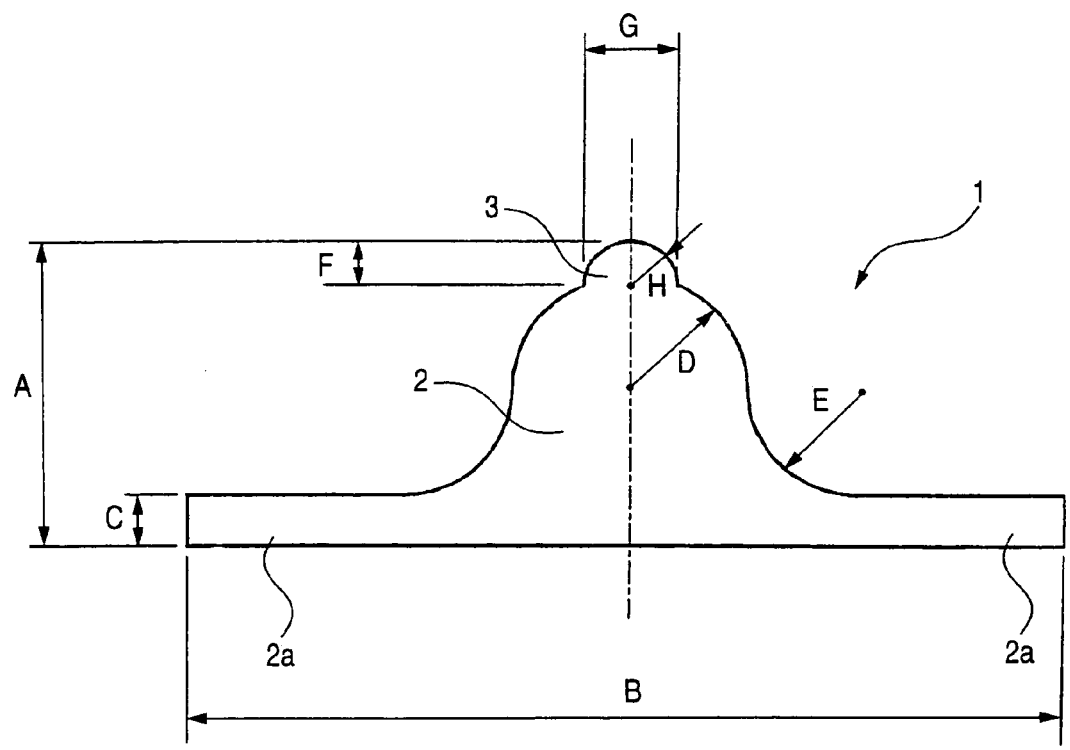
FIG. 1 is a sectional view showing a rubber gasket of this invention.
Figure 2:
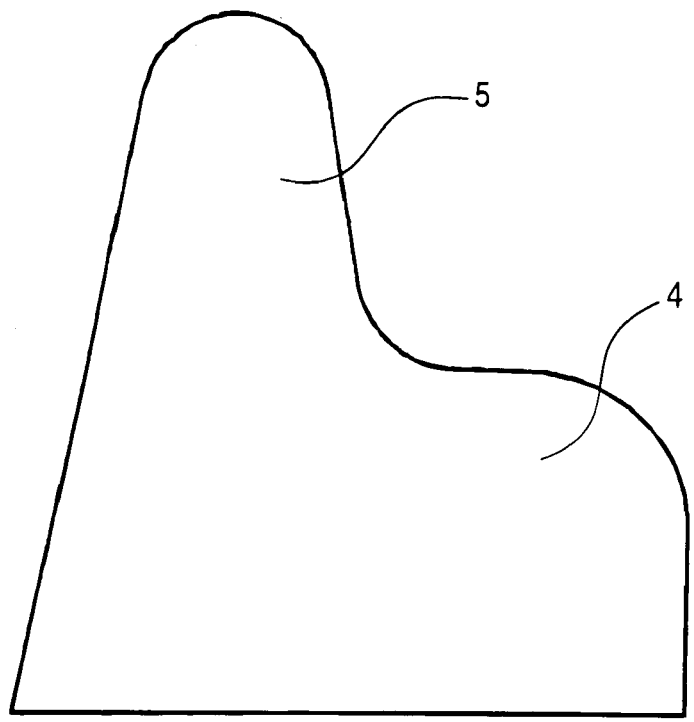
FIG. 2 is a sectional view, showing an example of conventional rubber gaskets.
Figure 3:
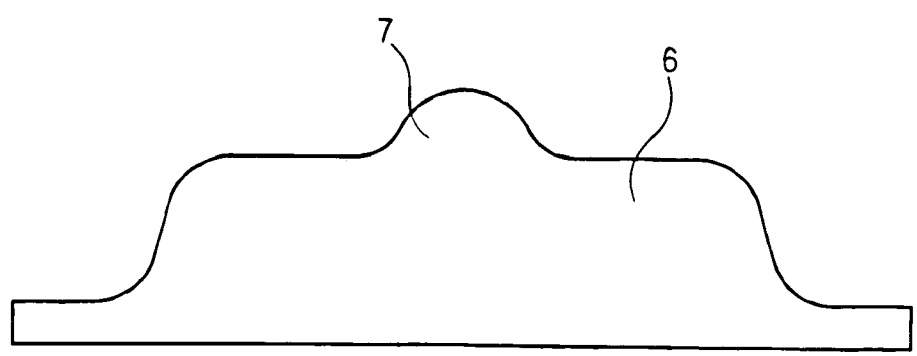
FIG. 3 is a sectional view showing another example of the conventional rubber gaskets.

The reference numerals used in the drawings denotes the following, respectively.

1: Rubber gasket
2: First projection
2a: Pedestal portion
3: Second projection

DETAILED DESCRIPTION OF THE INVENTION

Hereinafter, the present invention will be described in detail with reference to the drawings.

As shown in FIG. 1, a rubber gasket 1 of this invention has a sealing portion of a two-projection structure having a first projection 2 and a second projection 3 provided at the top of the first projection 2. The first projection has a substantially campanulate sectional shape having a curved slope of a curvature radius D and a foot portion of a curvature radius E extending continuously from a lower edge of the curved slope. The curvature radius D is preferably 0.15 mm or more, particularly preferably 0.20 mm or more. When the curvature radius D of the curved slope is less than 0.15 mm, a fracture (a longitudinal crack) may possibly occur in the rubber gasket, thereby causing deterioration in sealing property. In addition, though the value of the curvature radius E of the foot portion is not particularly limited, the curvature radius E may preferably be about the same as the curvature radius D.

The second projection 3 has a semicircle sectional shape having a curvature radius H and is formed near the top of the first projection 2 continuously from the curved slope. More specifically, the first projection 2 and the second projection 3 are overlaid with each other without any flat portion being formed in the boundary therebetween. The height of the second projection 3 is preferably 0.25 mm or less, more preferably 0.20 mm or less. When the height F of the second projection 3 exceeds 0.25 mm, the reaction force of the rubber gasket 1 under the low compression is reduced, thereby causing the deterioration in sealing property. Therefore, the location and the curvature radius H of the second projection 3 are set so as to achieve the height F of 0.25 mm or less. Generally, the curvature radius H is smaller than the curvature radius D.

Also, a pedestal portion 2a extending in a horizontal direction with a predetermined thickness C continuously from the foot portion of the first projection 2 is formed. The bottom of the pedestal portion 2a is made flat and this flat bottom surface is mounted on separators (not shown). The thickness C of the pedestal portion 2a is appropriately set depending on the total height A of the rubber gasket described below, and the width B of the pedestal portion 2a is also appropriately set to a value without any limitation.

The rubber gasket 1 is constituted by the sealing portion having the two-projection structure and the pedestal portion 2a as described above. When the total height A is less than 0.6 mm, the reaction force thereof may be reduced too much, thereby making it difficult to ensure the sealing property under the low compression. In turn, when the total height A exceeds 0.9 mm, the reaction force may be increased too much under the high compression, thereby causing a possibility of breakage of the separators. Therefore, good sealing property and reaction force are achieved by setting the total height A of the rubber gasket to a value from 0.60 to 0.90 mm, preferably from 0.65 to 0.85 mm.

The material to be used for forming the rubber gasket 1 of this invention is not particularly limited so far as the above-described shape is achieved, and it is possible to select any appropriate rubber composition among those which have heretofore been used for a rubber gasket for separators of fuel cell. Specific examples of the materials are as follows.

Examples of the rubber include a styrene-butadiene-styrene block copolymer (SBS), a styrene-ethylene-butadiene-styrene block copolymer (SBES), an ethylene-propylene copolymer (EP), a styrene-butadiene rubber (SBR), ethylene-propylene rubber (EPR), an ethylene-propylene-diene rubber (EPDM), an acrylonitrile-butadiene rubber (NBR), a hydrogenated acrylonitrile-butadiene rubber (HNBR), a natural rubber (NR), an isoprene rubber (IR), a chloroprene rubber (CR), a butyl rubber, a chlorinated butyl rubber, a brominated butyl rubber, a fluorine-containing rubber, a silicone rubber, and the like. Among the above rubbers, it is preferable to use HNBR or a fluorine-containing rubber for the formation of the two-projection structured sealing portion because they have high strength and heat resistance. Particularly, a fluorine-containing rubber is superior to HNBR in terms of the strength and the heat resistance.

There are various commercially available products of HNBR which are different from one another in average molecular weight, acrylonitrile content, iodine value and so forth, and they can be used appropriately. Examples of the commercially available products include, but not limited to, ZETPOL0020, ZETPOL1010, ZETPOL1020, ZETPOL2000, ZETPOL2000L, ZETPOL2010, ZETPOL2010H, ZETPOL2010L, ZETPOL2011, ZETPOL2011L, ZETPOL2020, ZETPOL2020L, ZETPOL2030L, ZETPOL3110, ZETPOL3120, ZETPOL3310, ZETPOL4310, and ZETPOL4320 (products of Zeon Corporation); Therban 1706, Therban 1707, Therban 1907, Therban 2207, Therban 1706S, Therban 1707S, Therban 1907S, and Therban 2207S (products of Bayer Material Science AG); and RCH7480X (product of Goodyear Tire and Rubber Company).

The above-described rubbers are crosslinked before use so as to ensure the strength Organic peroxides and sulfur are known as crosslinking agents for rubbers. However, in view of the fact that sulfur might exert an adverse effect on an electric power generation performance of the fuel cell, it is preferable in this invention to use an organic peroxide as a crosslinking agent. It is possible to use a wide variety of crosslinking agents conventionally-known for rubbers as the organic peroxide, and examples of the organic peroxide include dicumylperoxide (e.g., Percumyl D manufactured by NOF corporation), di-(t-butylperoxy)-diisopropylbenzene (e.g., Perbutyl P manufactured by NOF corporation), 2,5-dimethyl-2,5-di(t-butylperoxy) hexane (e.g., Perhexa 25B manufactured by NOF corporation), and d-t-hexyldicumylperoxide (e.g., Perhexyl D manufactured by NOF corporation). Among the above crosslinking agents, it is preferable to use 2,5-dimethyl-2,5-di(t-butylperoxy) hexane.

Also, a crosslinking assistant (crosslinking promoter) may be used in combination. It is possible to use a wide variety of crosslinking assistants conventionally-known for rubbers, and examples thereof include triallyl isocyanurate, trimethylrol propane trimethacrylate, polybutadiene, polyester having a double bonding, and polycyclooctene.

The amount of each of the crosslinking agent and the crosslinking assistant to be added may be set appropriately. The crosslinking agent is preferably added in an amount of from 0.1 to 10 parts by weight, more preferably from 0.5 to 7 parts by weight, and particularly preferably from 1 to 5 parts by weight per 100 parts by weight of the rubber. The crosslinking assistant is preferably added in an amount of from 0.01 to 10 parts by weight, more preferably from 0.05 to 7 parts by weight, and particularly preferably from 0.1 to 5 parts by weight per 100 parts by weight of the rubber.

Further, there may be added a rubber reinforcing filler such as a carbon black and silica, as well as a reinforcing fiber such as a glass fiber, a carbon fiber, a graphite fiber, an aramid fiber and a polyester fiber, as needed. Also, there may be added a filler such as an antioxidant and a clay mineral as well as various rubber modifiers such as a pigment, a dispersant, a coupling agent, a compatibilizer, a frame retarder, a surface smoother, a plasticizer, and a processing aid.

The rubber gasket 1 of this invention can be obtained by molding the above-described rubber compositions into the above-described specific shape in a similar manner to those employed in the conventional technique. The rubber composition can be obtained easily by mixing the above-described ingredients using an ordinary mixing device such as a two-roll mixer, a bunbury mixer, a pressure kneader and an extruder. At this time, the ingredients may be mixed each after being dissolved into a solvent. Although the molding conditions are selected depending on the formulation of the rubber composition, an example of the molding conditions is such that the rubber composition, is heated at 100 to 200° C. for 1 to 120 minutes, followed by a secondary crosslinking at 100 to 200° C. for 1 to 24 hours as needed. Also, a radiation crosslinking may be employed as the crosslinking method.

Similarly to the conventional technique, the rubber gasket 1 of this invention is adhered to the separators using an adhesive such as an epoxy resin-based one and a phenol resin-based one.

EXAMPLES

The present invention will be illustrated in greater detail with reference to the following Examples, but the invention should not be construed as being limited thereto.

Examples 1 to 7 and Comparative Example 1

A rubber composition was obtained by kneading using mixing rolls the following ingredients in accordance with an ordinary method.
- 100 parts by weight of HNBR (ZETPOL2020L manufactured by Zeon Corporation; nitrile content: 36%; iodine value; 28),
- 4.8 parts by weight of organic peroxide (Perhexa 25B manufactured by NOF Corporation),
- 2 parts by weight of a crosslinking assistant (NK Ester A-9300 manufactured by Shinnakamura Chemical Co., Ltd.),
- 2 parts by weight of an antioxidant (Nocrack CD manufactured by Ouchishinko Chemical Industries Co., Ltd.), and
- 30 parts by weight of a filler (N-990MT, a carbon black manufactured by Cancarb Limited).

Figure 4:
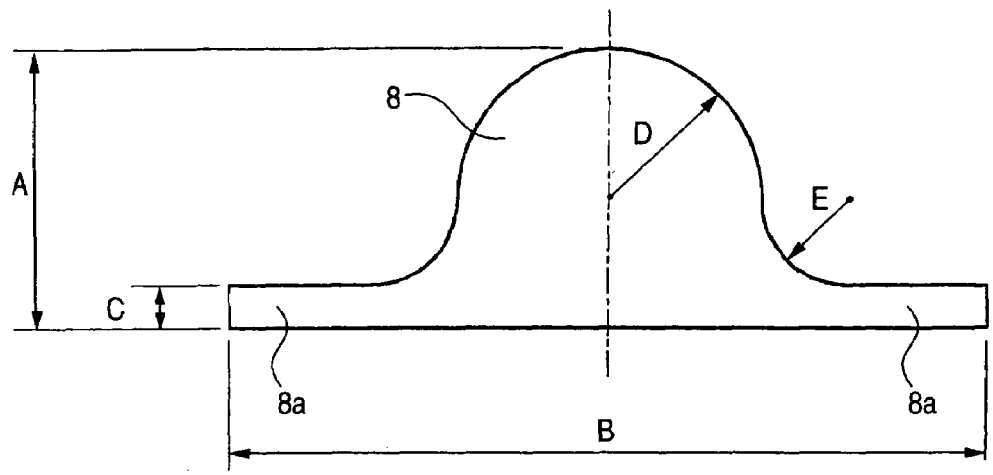
FIG. 4 is a diagram showing a sectional view wherein the dimensions of parts of the rubber gasket used in Comparative Example 1 are indicated.

After the lapse of several hours, the rubber composition was kneaded again, and then rubber gaskets each of which has the sectional shape shown in FIG. 1 and the dimensions indicated in Table 1 were produced by thermal pressing (Examples 1 to 7). Also, for the purpose of comparison, a rubber gasket which has the sectional shape shown in FIG. 4 and the dimensions indicated in Table 1 was produced by using the same rubber composition (Comparative Example 1). The rubber gasket shown in FIG. 4 has a one-projection structure in which a pedestal portion 8a extends continuously from a semicircular projection 8 having a curvature radius D.

The rubber gaskets were each evaluated in terms of a reaction force, a sealing property and a breakage, under the following conditions. The results are shown in Table 1.

Reaction Force

A reaction force in the case of a compression ratio of 60% was measured by using Autograph (a force sensor product of Shimadzu Corporation).

Sealing Property

Each of the rubber gaskets was placed in a flange, and then the flange was clamped so that a compression ratio of the rubber gasket becomes 15%, followed by being immersed in water together with the flange. The evaluation was made in accordance with the following criteria.

C: Bubbles rose with a load of 0.1 MPa of nitrogen gas;
B: Bubbles rose with a load of 0.3 MPa of nitrogen gas; and
A: No bubble rose with a load of 0.5 MPa of nitrogen gas.

Breakage

An appearance of each of the rubber gaskets after being immersed in an LLC solution (pure water:ethyleneglycol=1:1) for 2,000 hours was observed. The evaluation was made in accordance with the following criteria.

C: There was a breakage;
B: There was a slight breakage; and
A: There was no breakage.

TABLE 1

|  |  | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Dimensions (mm) | A: Total height | 0.74 | 0.69 | 0.79 | 0.65 | 0.85 | 0.74 | 0.74 | 0.73 |
|  | B: Width of pedestal portion | 1.95 | 1.82 | 2.08 | 1.71 | 2.24 | 1.95 | 1.95 | 2.00 |
|  | C: Thickness of pedestal portion | 0.12 | 0.11 | 0.13 | 0.10 | 0.13 | 0.10 | 0.10 | 0.12 |
|  | D: Curvature radius of curved slope in first projection | 0.26 | 0.24 | 0.28 | 0.23 | 0.30 | 0.20 | 0.18 | 0.14 |
|  | E: Curvature radius of foot portion in first projection | 0.25 | 0.23 | 0.27 | 0.22 | 0.29 | 0.34 | 0.34 | 0.25 |
|  | F: Height of second projection | 0.12 | 0.11 | 0.13 | 0.10 | 0.14 | 0.12 | 0.12 | — |
|  | G: Width of second projection | 0.20 | 0.20 | 0.20 | 0.20 | 0.20 | 0.20 | 0.20 | — |
|  | H: Curvature radius of second projection | 0.10 | 0.10 | 0.10 | 0.10 | 0.10 | 0.10 | 0.10 | — |
| Evaluation results | Reaction force (N/mm)[1)] | 2.9 | 2.0 | 4.4 | 1.7 | 5.4 | 2.9 | 2.8 | 26.2 |
|  | Sealing property | A | A | A | B | A | A | B | A |
|  | Gasket breakage (Longitudinal Crack) | A | A | A | A | A | A | B | A |

[1)]Actual measurement value

As shown in Table 1, the rubber gasket of Comparative Example 1 is considerably high in reaction force. Contrary, each of the rubber gaskets of Examples 1 to 7 having the two-projection structure according to this invention is good in reaction force and sealing property and exhibits good sealing property under each of the low compression condition and the high compression condition. Further, the gasket of Example 4 having the total height A of 0.65 mm is somewhat reduced in sealing property, and this reveals that it is preferable to set the total height A of the rubber gasket to 0.65 mm or more. Further, a slight breakage was found with the rubber gasket of Example 7 due to the first projection's curvature radius D of 0.18 mm, and the sealing property thereof was slightly deteriorated, too. This reveals that it is preferable to set the curvature radius D of the first projection to 0.20 mm or more.

Example 8 and Comparative Example 2

Figure 5:
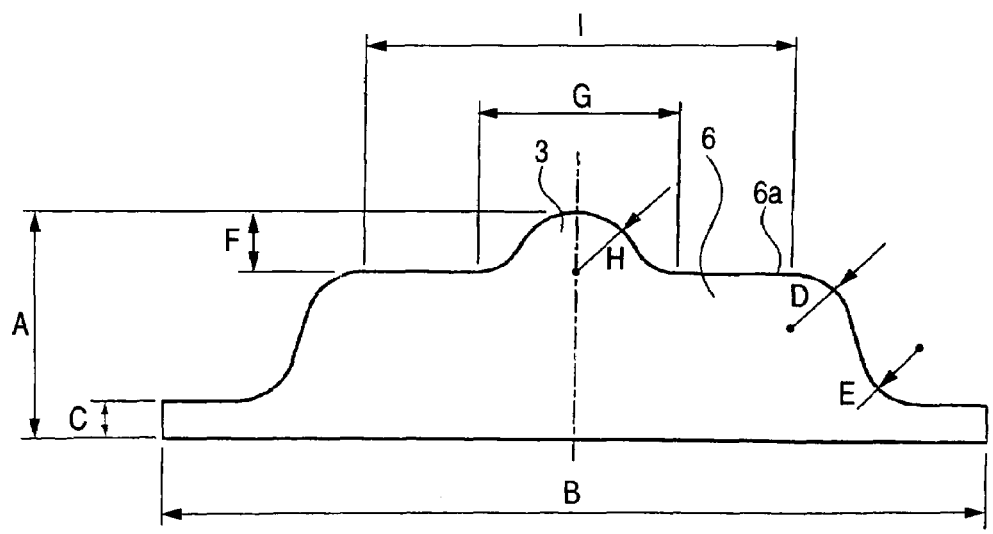
FIG. 5 is a diagram showing a sectional view wherein the dimensions of parts of the rubber gasket used in Comparative Example 2 are indicated.

A reaction force of the rubber gasket of Example 1 when being compressed up to a high compression ratio of 60% was determined using a finite element method (FEM analysis) (Example 8). Further, for the purpose of comparison, a rubber gasket (Comparative Example 2) which has the sectional shape shown in FIG. 5 and the dimensions indicated in Table 2 was produced by using the same rubber composition, and a reaction force thereof when being compressed up to a high compression ratio of 60% was determined using a finite element method (FEM analysis). The rubber gasket shown in FIG. 5 is similar to that of Patent Document 2, wherein a portion 6 which corresponds to the first projection extends horizontally to form a flat portion 6a (width I). The other dimensions were made the same as those of Example 1. The results are shown in Table 2.

TABLE 2

|  |  | Ex. 8 | Comp. Ex. 2 |
|---|---|---|---|
| Dimensions (mm) | A: Total height | 0.74 | 0.74 |
|  | B: Width of pedestal portion | 1.95 | 1.95 |
|  | C: Thickness of pedestal portion | 0.12 | 0.12 |
|  | D: Curvature radius of curved slope in first projection | 0.26 | 0.26 |
|  | E: Curvature radius of foot portion in first projection | 0.25 | 0.25 |
|  | F: Height of second projection | 0.12 | 0.12 |
|  | G: Width of second projection | 0.20 | 0.20 |
|  | H: Curvature radius of second projection | 0.10 | 0.10 |
|  | I: Width of flat portion | — | 0.93 |
| Reaction Force (N/mm)[*2)] |  | 4.5 | 14.0 |

[*2)]Evaluated value by FEM analysis

As shown in Table 2, the rubber gasket of Comparative Example 2 is considerably increased in reaction force under the high compression due to the flat portion 6a.

While the present invention has been described in detail and with reference to specific embodiments thereof, it will be apparent to one skilled in the art that various changes and modifications can be made therein without departing from the spirit and scope thereof.

This application is based on Japanese patent application No 2003-282774 filed on Jul. 30, 2003, the content thereof being herein incorporated by reference.

What is claimed is:

1. A rubber gasket to be disposed in a compressed state between separators of a fuel cell, which comprises:
   a sealing portion having a sectional shape of a two-projection structure comprising:
      a first projection having a curved slope of a first curvature radius (D); and
      a second projection provided on the first projection and having a second curvature radius (H); and
   a pedestal portion that extends in a horizontal direction with a predetermined thickness continuously from a foot portion of the curved slope of the first projection and has a flat bottom surface,
   wherein a height (A) from the bottom of the pedestal portion to the top of the second projection is from 0.60 to 0.90 mm.

2. The rubber gasket according to claim 1, wherein the height (A) is from 0.65 to 0.85 mm.

3. The rubber gasket according to claim 1, which is formed from a rubber composition containing at least one of HNBR and a fluorine-containing rubber.

4. The rubber gasket according to claim 3, wherein the rubber composition further contains a crosslinking agent.

5. The rubber gasket according to claim 3, wherein the rubber composition further contains a crosslinking assistant.

6. A rubber gasket to be disposed in a compressed state between separators of a fuel cell, which comprises:
   a sealing portion having a sectional shape of a two-projection structure comprising:
      a first projection having a curved slope of a first curvature radius (D); and
      a second projection provided on the first projection and having a second curvature radius (H); and
   a pedestal portion that extends in a horizontal direction with a predetermined thickness continuously from a foot portion of the curved slope of the first projection and has a flat bottom surface,
   wherein the first curvature radius (D) of the curved slope of the first projection is 0.15 mm or greater.

7. The rubber gasket according to claim 6, wherein the first curvature radius (D) is 0.20 mm or greater.

8. A rubber gasket to be disposed in a compressed state between separators of a fuel cell, which comprises:
   a sealing portion having a sectional shape of a two-projection structure comprising:
      a first projection having a curved slope of a first curvature radius (D); and
      a second projection provided on the first projection and having a second curvature radius (H); and
   a pedestal portion that extends in a horizontal direction with a predetermined thickness continuously from a foot portion of the curved slope of the first projection and has a flat bottom surface,
      wherein the second projection has a height (F) of 0.25 mm or less.

9. The rubber gasket according to claim 8, wherein the height (F) is 0.20 mm or less.

* * * * *